(12) United States Patent
Powell et al.

(10) Patent No.: US 8,388,016 B1
(45) Date of Patent: Mar. 5, 2013

(54) STROLLER DEVICE FOR TRANSPORTING LOUNGE CHAIRS

(76) Inventors: Annitta L. Powell, Wallace, NC (US); Randy C. Ingram, Wallace, NC (US)

( * ) Notice: Subject to any disclaimer, the term of this patent is extended or adjusted under 35 U.S.C. 154(b) by 328 days.

(21) Appl. No.: 12/606,994

(22) Filed: Oct. 27, 2009

(51) Int. Cl.
 *B62B 1/00* (2006.01)
(52) U.S. Cl. .................. 280/650; 280/647; 280/658
(58) Field of Classification Search .............. 280/642, 280/647, 648, 641, 650, 651, 658, 47.34, 280/47.38, 47.32, 47.25, 47.131
See application file for complete search history.

(56) References Cited

U.S. PATENT DOCUMENTS

| | | | | |
|---|---|---|---|---|
| 5,106,108 A | * | 4/1992 | Howell | 280/47.25 |
| 5,188,138 A | * | 2/1993 | Yamasaki et al. | 280/641 |
| 5,383,585 A | * | 1/1995 | Weiss | 280/30 |
| 5,511,802 A | * | 4/1996 | Aitken | 280/47.32 |
| 5,794,639 A | * | 8/1998 | Einbinder | 280/47.34 |
| 6,220,621 B1 | * | 4/2001 | Newton | 280/650 |
| D524,560 S | * | 7/2006 | Berhow et al. | D6/335 |
| 7,527,283 B2 | * | 5/2009 | Horacek | 280/642 |
| 7,614,641 B2 | * | 11/2009 | Hartenstine et al. | 280/642 |
| 7,770,912 B2 | * | 8/2010 | Liao | 280/651 |
| 7,854,435 B2 | * | 12/2010 | Campbell | 280/47.131 |
| D648,913 S | * | 11/2011 | Fung | D34/15 |
| 2002/0084617 A1 | * | 7/2002 | Torsiello | 280/648 |
| 2006/0214396 A1 | * | 9/2006 | Horacek | 280/642 |

* cited by examiner

Primary Examiner — Hau Phan

(57) ABSTRACT

A stroller device comprising a frame having a first end and a second end; a handle telescopically received in a handle attachment component disposed on the first end of the frame; a wheel shaft telescopically received in a wheel attachment component disposed on the second end of the frame, wherein a wheel is disposed on the wheel shaft; optionally a prop leg attached to the frame via an attachment mechanism, the prop leg functions to help prop up the stroller device in an upright position; and a first securing strap disposed on the frame for helping to secure an item atop the frame.

11 Claims, 6 Drawing Sheets

STROLLER DEVICE FOR TRANSPORTING LOUNGE CHAIRS

FIELD OF THE INVENTION

The present invention is directed to dollies, strollers, and other transporting devices. More particularly, the present invention is directed to a stroller for transporting a lounge chair or other item from one place to another.

BACKGROUND OF THE INVENTION

In many situations, an individual may wish to transport his/her lounge chair to another location. For example, if an individual has a specialized lounge chair that is tailored to meet his/her needs, he/she may wish to bring it with him/her instead of using a standard lounge chair. The present invention features a stroller device for allowing a user to easily transport items such as lounge chairs from one place to another. The stroller device comprises a prop leg, which can help the stroller device remain upright when not in use.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
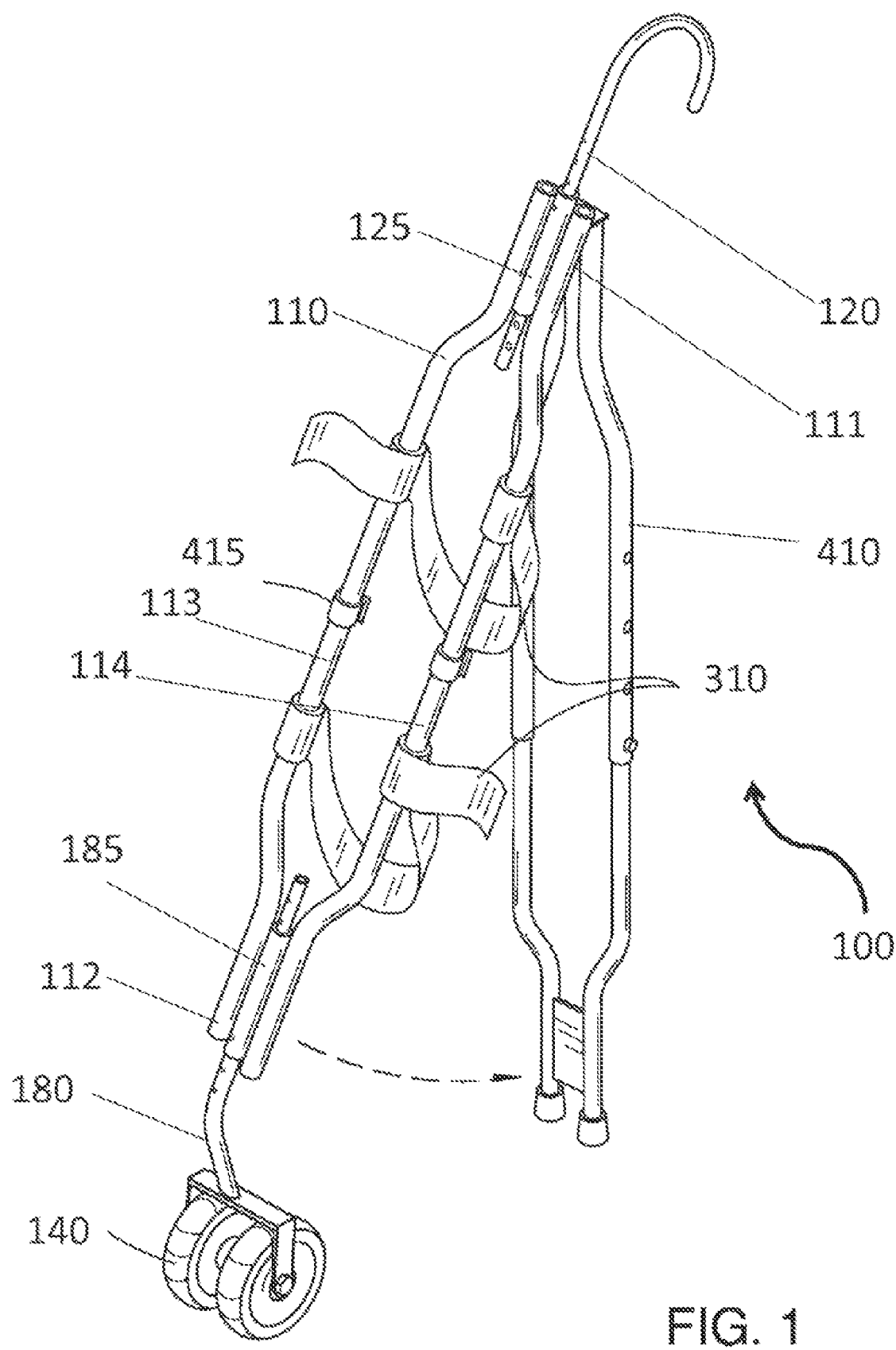
FIG. 1 is a perspective view of a first embodiment of the stroller device of the present invention, featuring the stroller device comprising a prop leg.

Referring now to FIGS. 1-5, the present invention features a stroller device 100 for transporting an item such as a lounge chair 108. The stroller device 100 comprises a frame 110 (e.g., a tubular frame lying on a plane 900). In some embodiments, the frame 110 is generally oval in shape, for example the frame 110 has a hollow center, a first end 111, a second end 112, a first side 113, and a second side 114. The frame 110 may be constructed from a variety of materials, for example from plastic or metal tubing.

In some embodiments, a handle 120 is disposed on the first end 111 of the frame 110. The handle may be curved or constructed in a shape that would be easy and/or comfortable for a user to grip. In some embodiments, the handle 120 comprises a material that is comfortable for the user and/or easy for the user to grip. In some embodiments, the handle 120 is telescopically received in a handle attachment 125 component disposed on the first end 111 of the frame 110. The handle 120 can slide upwardly and downwardly in the handle attachment component 125 so as to adjust the height of the handle 120 (and the overall height of the device 100). Telescopic mechanisms such as this are well known to one of ordinary skill in the art. In some embodiments, the handle 120 can be secured in a particular position within the handle attachment component 125 via a locking means (e.g., via a first spring-loaded pin 210 and a plurality of first apertures 215).

Figure 1A:
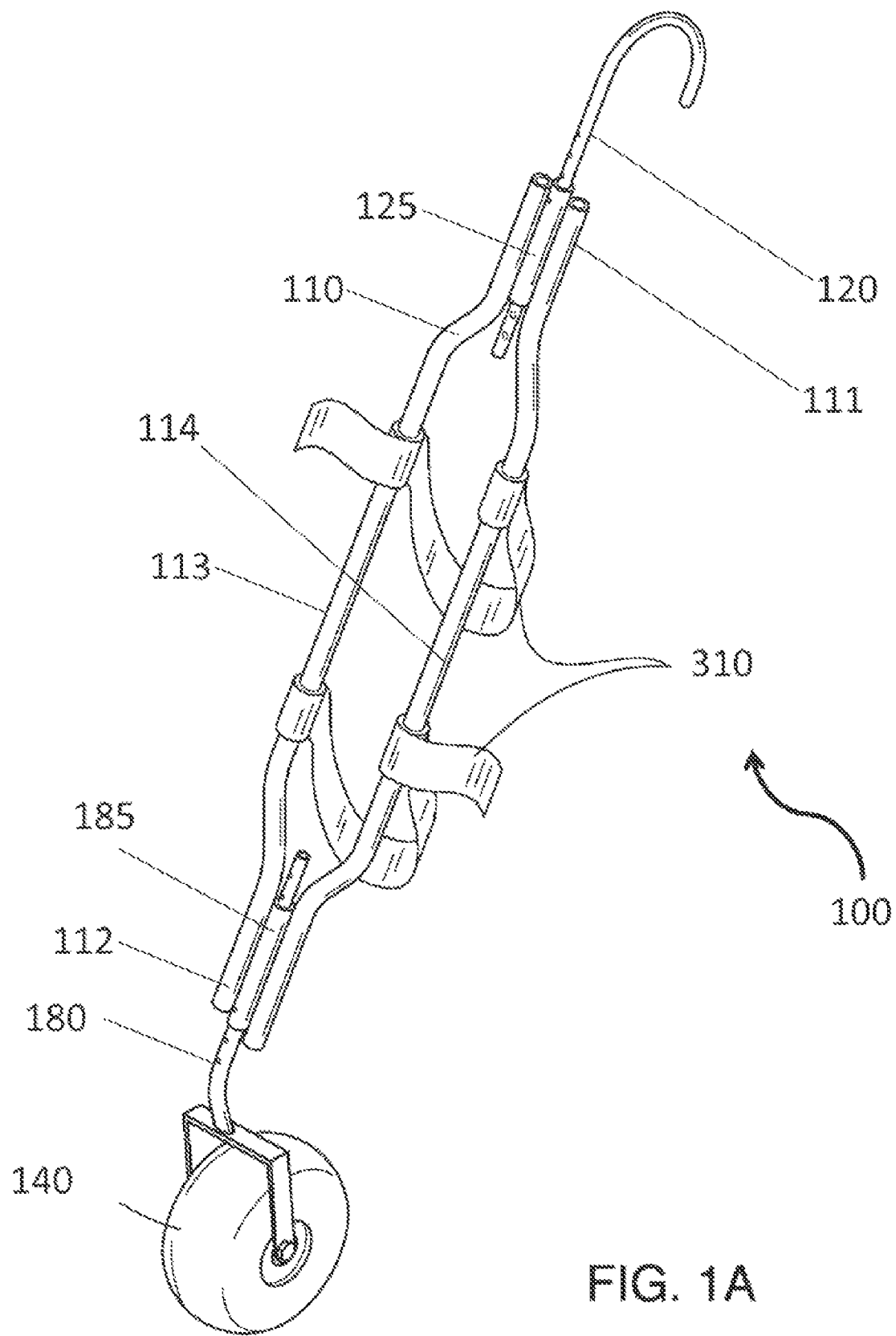
FIG. 1A is a perspective view of a second embodiment of the stroller device of the present invention, featuring the planar, oval frame.
Figure 2:
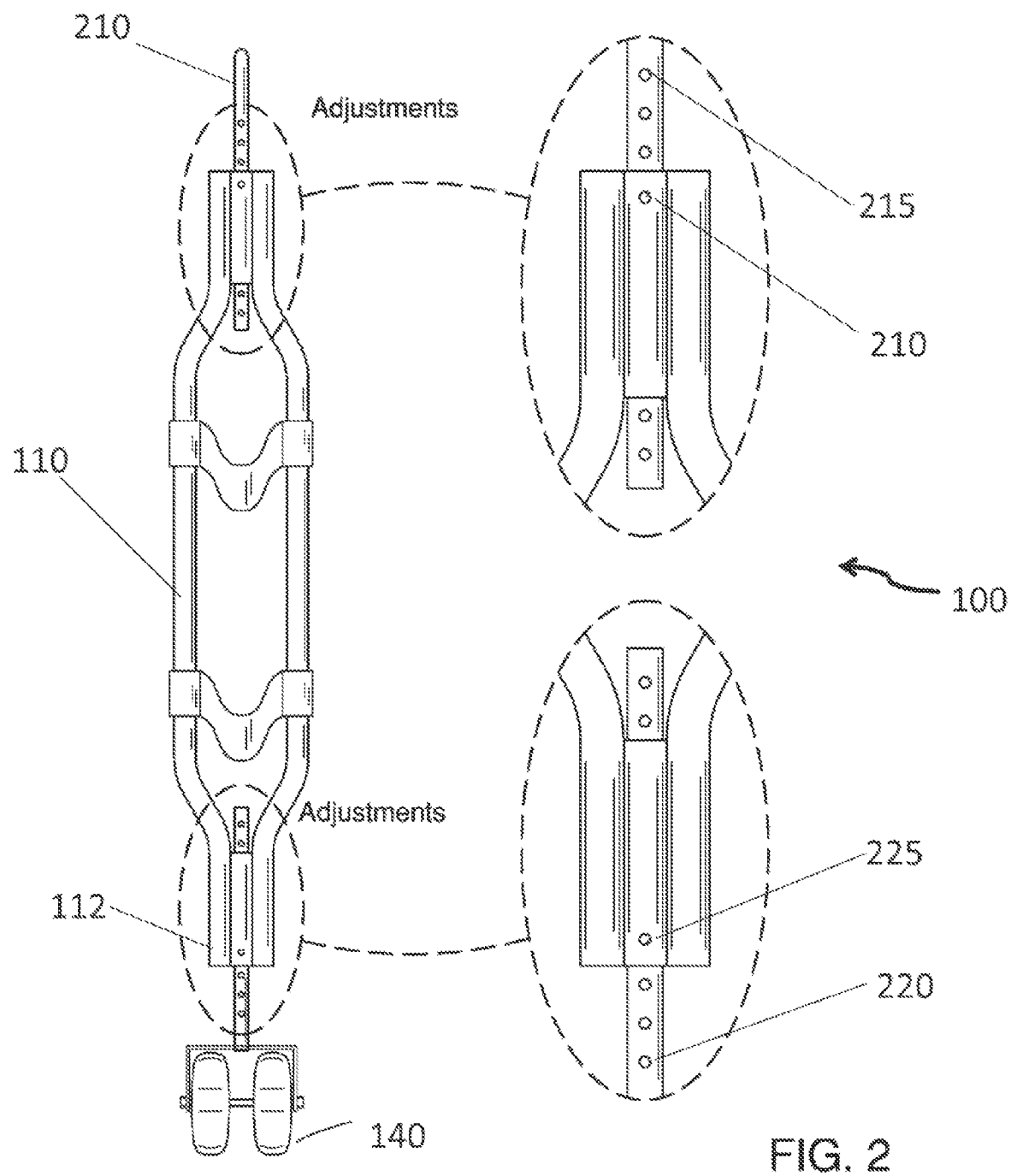
FIG. 2 is a front view and an exploded view of the stroller device of FIG. 1A, featuring the telescopic handle and the single wheel shaft.
Figure 3:
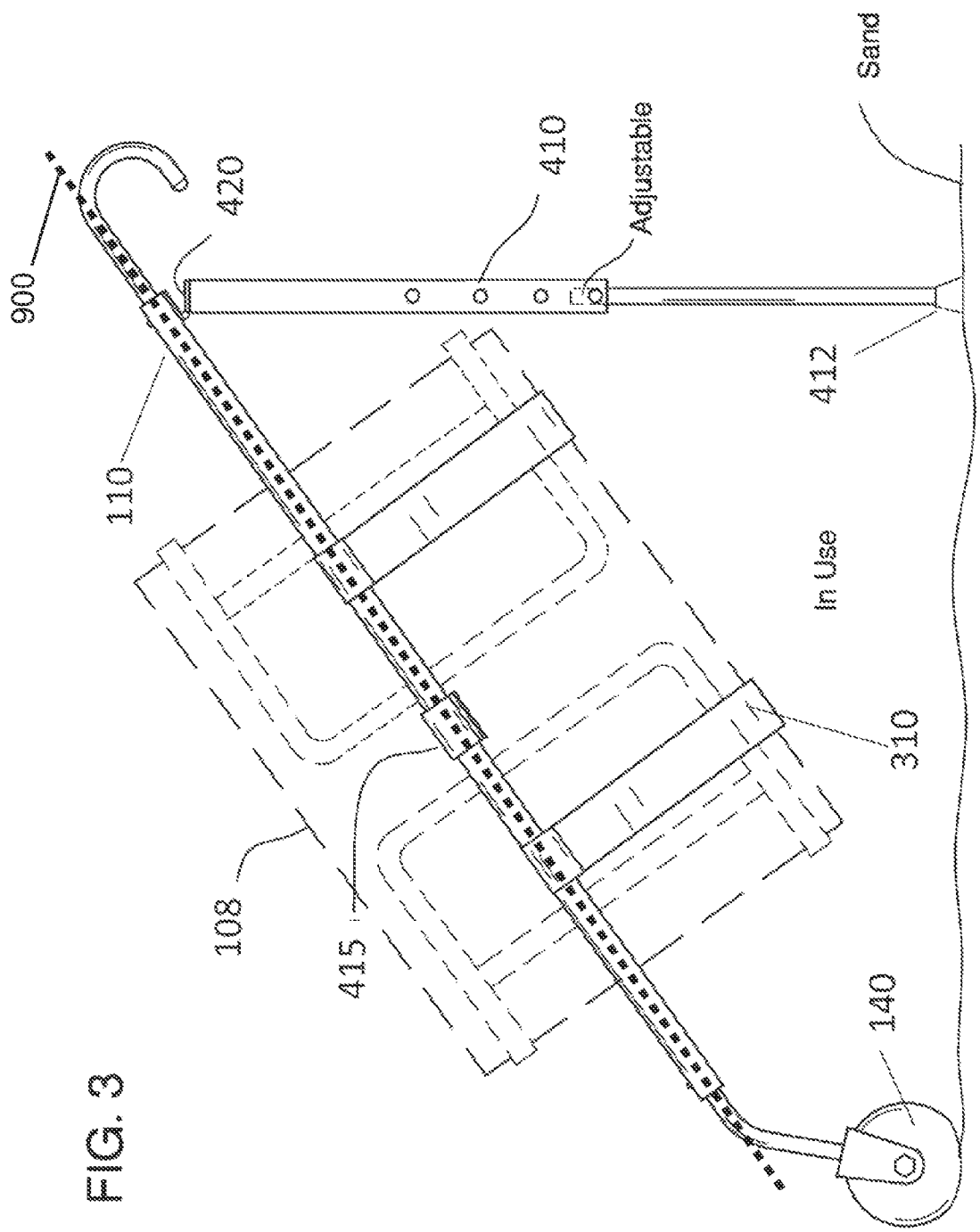
FIG. 3 is a first side view of the stroller device of FIG. 1 in use, featuring the terminating end of the prop leg and the planar frame.

The stroller device 100 comprises one or more wheels 140 for moving the stroller device 100 from one place to another. The wheel 140 may include but is not limited to a standard wheel, a caster wheel, a sand tire (FIG. 1) or a balloon tire (FIG. 1A). In some embodiments, a wheel 140 is attached to the second end 112 of the frame 110 via a wheel shaft 180.

In some embodiments, a wheel attachment component 185 is disposed on the second end 112 of the frame 110 and the wheel shaft 180 is telescopically received in the wheel attachment component 185. The wheel shaft 180 can slide upwardly and downwardly in the wheel attachment component 185 so as to adjust the height of the device 100. In some embodiments, the wheel shaft 180 can be secured in a particular position within the wheel attachment component 185 via a locking means (e.g., via a second spring-loaded pin 225 and a plurality of second apertures 220).

In some embodiments, the device comprises one or more securing straps 310 disposed on the frame 110 for helping to secure an item (e.g., lounge chair 108) when placed atop the frame 110. In some embodiments, the securing strap 310 (e.g., a first end of the securing strap) is attached to the first side 113 of the frame 110 and/or the second side 114 of the frame 110. As an example, the strap 310 can be wrapped around the item (e.g., lounge chair) and the strap 310 (e.g., the second end of the strap 310) can be snugly attached to the frame 110.

Figure 4:
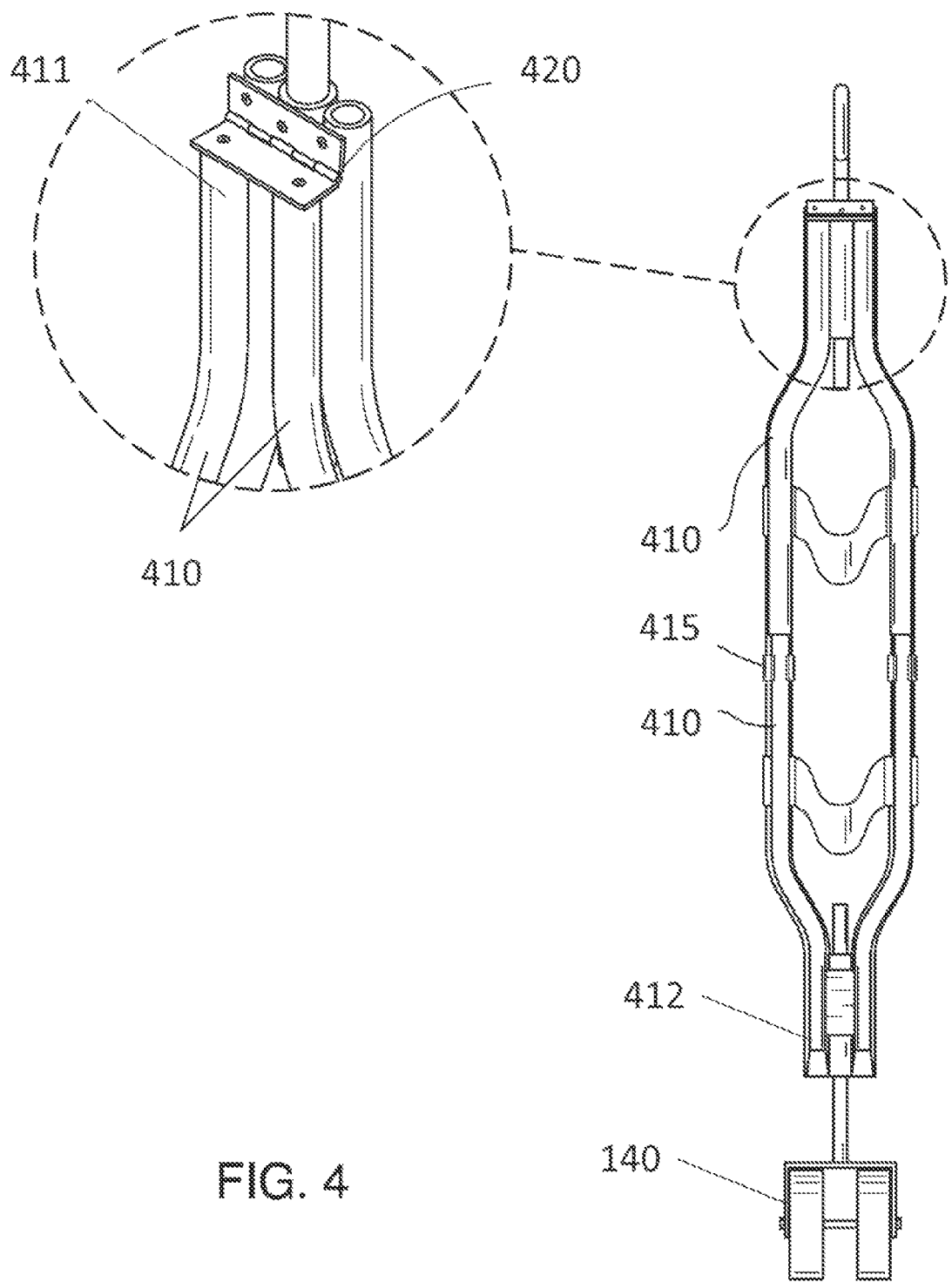
FIG. 4 is a back view of the stroller device of FIG. 1, featuring the prop leg held in two clips.
Figure 5:
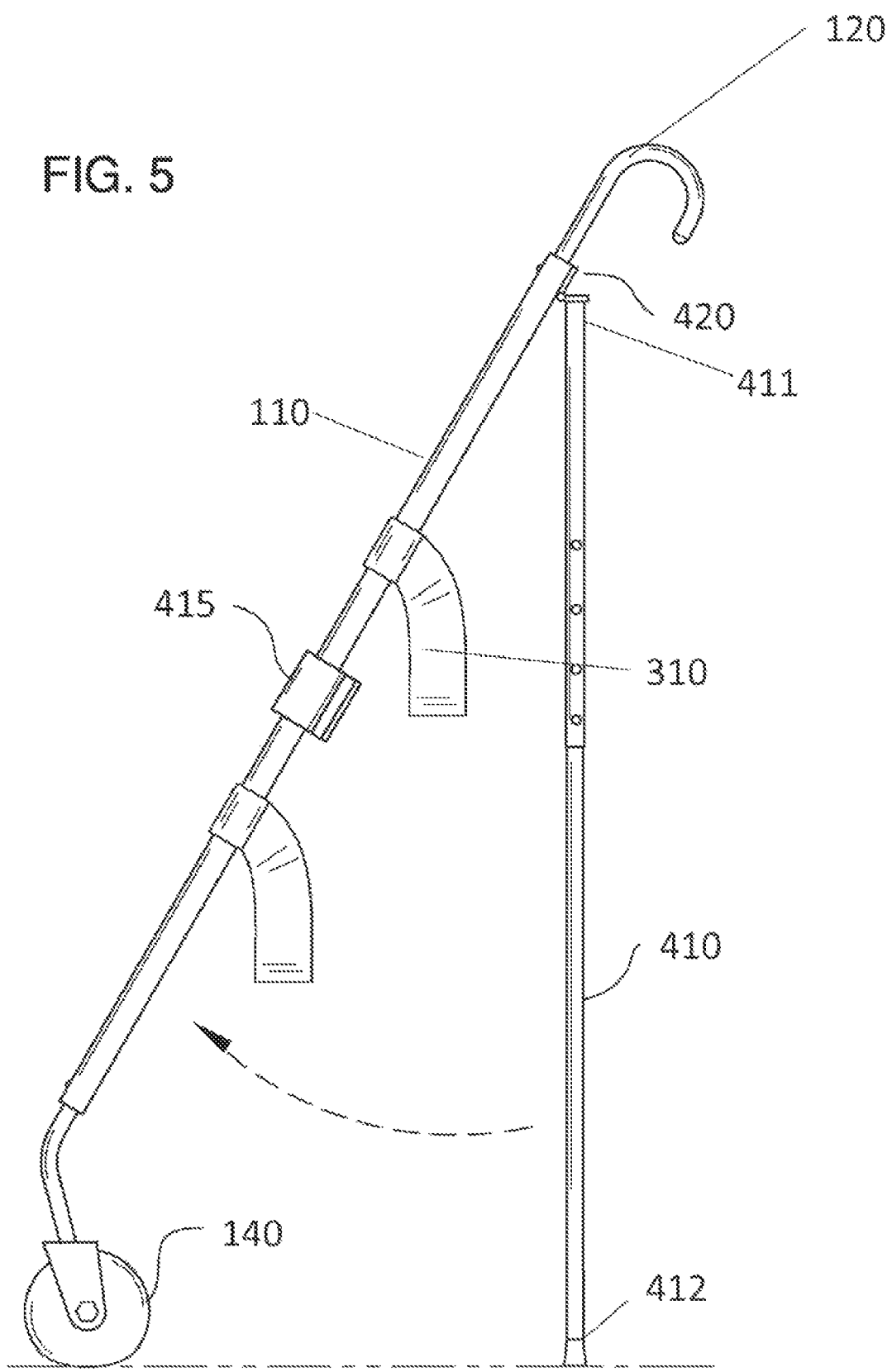
FIG. 5 is a second side view of the stroller device of FIG. 1, featuring the prop leg attached to a back side of the frame rather than the first side or second side.

In some embodiments, the stroller device 100 further comprises a separate prop leg 410 that can be attached to the stroller device 100 via an attachment means 420 (e.g., hinge). The prop leg 410 may be used to prop up the stroller device 100 in an upright position. The prop leg 410 has a first end 411 and a second end 412. As shown in FIG. 1 and FIG. 4, in some embodiments, the prop leg 410 is generally oval shaped (e.g., similar in shape to the oval-shaped frame). In some embodiments, the prop leg 410 is generally L-shaped, for example, the portion of the prop leg 410 at the second end 412 is bent away from the remaining portion of the prop leg 410.

As shown in FIG. 4, the first end 411 of the prop leg 410 is attached to the frame 110 via an attachment device 420 (e.g., hinge). In some embodiments, the prop leg 410 is attached near the first end 111 of the frame 110 or on the handle attachment component 125. The prop leg 410 can move between a stored position and a prop position. In the prop position, the second end 412 of the prop leg 410 is pivoted away from the frame 110 and rested on the ground (see FIG. 3). In the stored position, the prop leg 410 is pivoted toward the frame 110, generally contacting the frame 110. In some embodiments, a securing means 415 (e.g., a clip) may secure the prop leg 410 in the stored position. In some embodiments, the securing means 415 is disposed on the frame 110 and engages (clips) the prop leg 410. In some embodiments, the securing means 415 is disposed on the prop leg 410 and engages (clips) the frame 110.

In some embodiments, the prop leg 410 is adjustable in height, for example, via a telescopic mechanism. In some embodiments, the prop leg 410 can be secured at a particular height via a locking means (e.g., via a spring-loaded pin and a plurality of apertures).

In some embodiments, the attachment device 420 (for attaching the prop leg 410 to the frame 110) is a hinge mechanism, a hook mechanism, a clip mechanism, a snap mechanism, the like, or a combination thereof. The prop leg 410 may not be permanently attached to the frame 110 via the attachment means 420.

The present invention also features a method of transporting an item such as a lounge chair 108. The method comprises obtaining a stroller device 100 of the present invention. An item such as a lounge chair 108 or other item can be loaded atop the stroller device 100, for example laid on the top surface of the frame 110. In some embodiments, the strap 310 (or multiple straps or other attachment means) is then used to secure the item to the stroller device 100. When the item (e.g., lounge chair 108) is secured to the frame 110, the user can lift the handle 120 and move the lounge chair 108 as he/she wishes via the wheels 140. If the user needs to adjust the height of the device 100, he/she can slide the wheel shaft 180 in or out of the wheel attachment component 185 and/or slide the handle 120 in or out of the handle attachment component 125.

In some embodiments, the wheels 140 can be locked via a locking means that can move between a locked position and an unlocked position for respectively preventing or allowing the wheels 140 to rotate. Locking the wheels 140 may be useful, for example if the user wishes to prevent the stroller device 100 from rolling away if he/she is loading the lounge chair (or other item).

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A stroller device (100) comprising:
    (a) a frame (110) having a first end (111) and a second end (112), wherein the frame (110) is generally oval in shape to form a hollow center, a first side (113) and a second side (114), wherein the first side (113) and second side (114) rest on a single plane (900) where said oval shape is formed and resides on;
    (b) a handle (120) telescopically received in a single handle attachment component (125) disposed on the first end (111) of the frame (110);
    (c) a single wheel shaft (180) telescopically received in a single wheel attachment component (185) disposed on the second end (112) of the frame (110), wherein a wheel (140) is disposed on the wheel shaft (180); and
    (d) a first securing strap (310) disposed on the frame (110) for helping to secure an item atop the frame (110);
wherein the stroller device (100) further comprises a prop leg (410) attached to the first end (111) of the frame (110) via an attachment means (420), the prop leg (410) functions to help prop up the stroller device (100) in an upright position, wherein the prop leg (410) can move between a prop position wherein a second end (412) of the prop leg (410) is pivoted away from the frame (110) and rested on a ground surface and a stored position where the prop leg (410) is pivoted toward the frame (110), generally contacting the frame (110), wherein the prop leg (410) can be secured in a stored position via a securing means (415) when moving; the second end (412) of the prop leg (410) terminates without an attachment of any wheels (140), wherein the second end (412) functions as a brake to prevent the stroller device (100) from rolling away, the second end (412) functions as a brake by resting on a surface and gripping thereto;
wherein the prop leg (410) does not attach to the first (113) or second side (114) of the frame (110) as to not interfere with the hollow center for storage of a lounge chair (108).

2. The stroller device (100) of claim 1, wherein the frame (110) is constructed from plastic or metal tubing.

3. The stroller device (100) of claim 1, wherein the handle (120) is curved.

4. The stroller device (100) of claim 1, wherein the handle (120) is secured in a particular position within the handle attachment component (125) via a first locking means.

5. The stroller device (100) of claim 4, wherein the first locking means includes a first spring-loaded pin (210) and a first aperture (215).

6. The stroller device (100) of claim 1, wherein the wheel shaft (180) is secured in a particular position within the wheel attachment component (185) via a second locking means.

7. The stroller device (100) of claim 6, wherein the second locking means includes a second spring-loaded pin (225) and a second aperture (220).

8. The stroller device (100) of claim 1, wherein the wheels (140) can be prevented from rotating via a locking means.

9. The stroller device (100) of claim 1, wherein the prop leg (410) is generally oval in shape.

10. The stroller device (100) of claim 1, wherein the attachment device (420) is a hinge mechanism, a hook mechanism, a clip mechanism, or a snap mechanism.

11. The stroller device (100) of claim 1, wherein the prop leg (410) is adjustable in height.

\* \* \* \* \*